US008640092B2

(12) United States Patent
Niimura et al.

(10) Patent No.: US 8,640,092 B2
(45) Date of Patent: Jan. 28, 2014

(54) COMPATIBILITY EVALUATION APPARATUS, COMPATIBILITY EVALUATION METHOD, AND RECORDING MEDIUM

(75) Inventors: Kenji Niimura, Tokyo (JP); Tsutomu Ohishi, Tokyo (JP); Taku Ikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 440 days.

(21) Appl. No.: 12/795,203

(22) Filed: Jun. 7, 2010

(65) Prior Publication Data

US 2010/0333068 A1 Dec. 30, 2010

(30) Foreign Application Priority Data

Jun. 25, 2009 (JP) .................................. 2009-150817

(51) Int. Cl.
*G06F 9/44* (2006.01)
(52) U.S. Cl.
USPC ........................................ 717/120; 717/110
(58) Field of Classification Search
USPC .................. 717/110–113, 120–123, 168–178
See application file for complete search history.

(56) References Cited

U.S. PATENT DOCUMENTS

| 6,366,876 | B1 * | 4/2002 | Looney | 703/25 |
| 7,178,141 | B2 * | 2/2007 | Piazza | 717/168 |
| 7,188,333 | B1 * | 3/2007 | LaMotta et al. | 717/106 |
| 7,284,190 | B2 * | 10/2007 | Chellis et al. | 715/229 |
| 7,506,336 | B1 * | 3/2009 | Ninan | 717/175 |
| 7,716,642 | B1 * | 5/2010 | Michael et al. | 717/124 |
| 8,151,257 | B2 * | 4/2012 | Zachmann | 717/170 |
| 2002/0129338 | A1 | 9/2002 | MacDonell | |
| 2004/0205745 | A1 * | 10/2004 | Piazza | 717/168 |
| 2006/0015807 | A1 * | 1/2006 | Chellis et al. | 715/511 |
| 2006/0048141 | A1 * | 3/2006 | Persson et al. | 717/176 |
| 2007/0250829 | A1 * | 10/2007 | Hillier et al. | 717/170 |

(Continued)

FOREIGN PATENT DOCUMENTS

| EP | 1 387 268 A2 | 2/2004 |
| EP | 1 387 268 A3 | 2/2004 |

(Continued)

OTHER PUBLICATIONS

Chakrabarti et al., "Interface Compatibility Checking for Software Modules," 2002, Springer-Verlag, p. 428-441.*

(Continued)

*Primary Examiner* — Wei Zhen
*Assistant Examiner* — Qing Chen
(74) *Attorney, Agent, or Firm* — Oblon, Spivak, McClelland, Maier & Neustadt, L.L.P.

(57) ABSTRACT

A compatibility evaluation apparatus for evaluating compatibility between a platform program and an application program that uses interfaces provided by the platform program, includes an application analyzing unit configured to analyze the application program and extract a list of the interfaces used by the application program; an incompatibility interface usage determination unit configured to extract, from the list of the interfaces used by the application program, an interface that corresponds to an incompatible interface that does not satisfy a specification, the interface being extracted with the use of a first storage unit storing information indicating contents of incompatibility for each of the incompatible interfaces among the interfaces provided by the platform; and a compatibility report creating unit configured to record, in a second storage unit, the information indicating contents of incompatibility for each interface that has been extracted by the incompatibility interface usage determination unit.

17 Claims, 19 Drawing Sheets

(56) References Cited

U.S. PATENT DOCUMENTS

2008/0256564 A1* 10/2008 Fathalla .................. 719/331
2008/0301668 A1* 12/2008 Zachmann ................ 717/173
2010/0306757 A1* 12/2010 Becker et al. ............. 717/170

FOREIGN PATENT DOCUMENTS

| EP | 1 019 803 B1 | 7/2004 |
|---|---|---|
| JP | 2001-518658 | 10/2001 |
| JP | 2005-269619 | 9/2005 |
| JP | 2010-20561 | 1/2010 |

OTHER PUBLICATIONS

Mariani et al., "Compatibility and regression testing of COTS-component-based software," 2007, IEEE.*
Yoon et al., "Effective and Scalable Software Compatibility Testing," Jul. 2008, ACM, p. 63-73.*
Extended European Search Report issued Oct. 11, 2010, in Patent Application No. 10165200.6.
Twittie Senivongse, "Enabling Flexible Cross-Version Interoperability for Distributed Services", Distributed Objects and Applications, Proceedings of the International Symposium on Edinburgh, XP 002954505, Sep. 5, 1999, pp. 1-10.

* cited by examiner

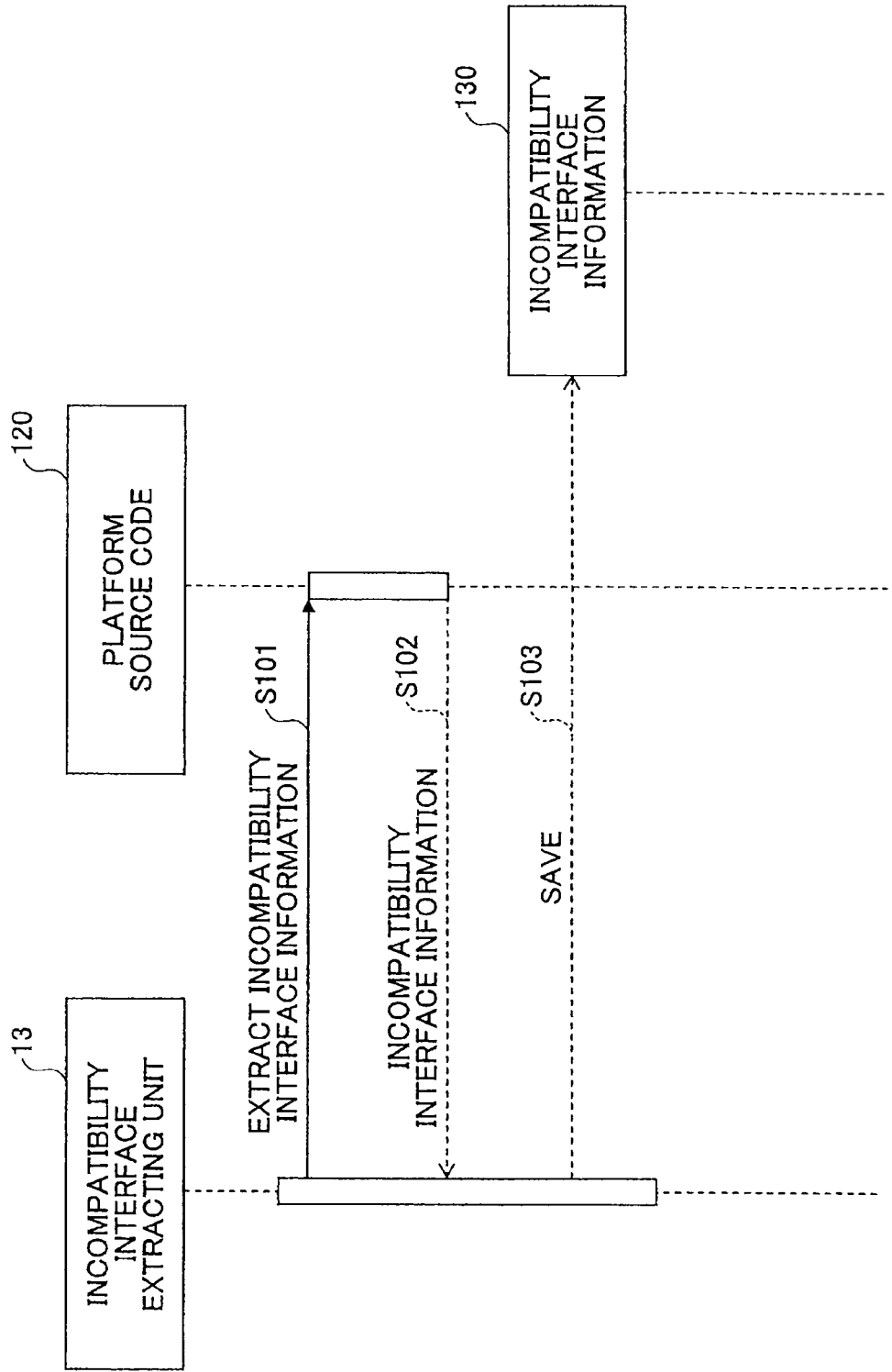

FIG.5

```
class A {
/**
 * @not_notified THIS EVENT IS NOT NOTIFIED.                      ──121
 */
public static final JobEvent XXX_EVENT = new A(XXX);    ──122

/**
 * RETURN VALUE OF X.
 * <BR>
 * THIS CONSTRUCTOR IS UNSUPPORTED.
 * @unsupported
 *       THIS METHOD IS UNSUPPORTED.                              ──123
 *       FOR THE APPLICATION USING THIS METHOD, PLEASE MAKE
 *       CORRECTION SO THAT IT USES set Y METHOD OF class B.
 */
public void setX(Object obj){
throw new UnsupportedOperationException("This method is not supported.");    ──124
}
..
}
```

| CLASS NAME | INTERFACE NAME | TYPE OF INCOMPATIBILITY | NOTIFICATION MESSAGE |
|---|---|---|---|
| A | XXX_EVENT | not_notified | THIS EVENT IS NOT NOTIFIED. |
| A | public void setX(Object obj) | unsupported | THIS METHOD IS UNSUPPORTED. FOR THE APPLICATION USING THIS METHOD, PLEASE MAKE CORRECTION SO THAT IT USES set Y METHOD OF class B. |
| | | | |
| | | | |

| CLASS NAME | INTERFACE NAME |
|---|---|
| A | public void setX(Object obj) |
| C | public void setY(Object obj) |
| C | public void setZ(Object obj) |
| ⋮ | ⋮ |

150B: NOTFOUND: METHOD C#setZ DOES NOT EXIST IN SDK PLATFORM version XXX.

FIG.13

```
class A {
/**
 * @not_notified THIS EVENT IS NOT NOTIFIED.          ~121
 */
public static final JobEvent XXX_EVENT = new A(XXX);  ~122

/**
 * RETURN VALUE OF X.
 * <BR>
 * THIS CONSTRUCTOR IS UNSUPPORTED.
 * @unsupported (rule = around B#setY(Object obj))
 *     THIS METHOD IS UNSUPPORTED.
 *     FOR THE APPLICATION USING THIS METHOD, PLEASE MAKE
 *     CORRECTION SO THAT IT USES setY METHOD OF class B.     ~123B
 */
public void setX(Object obj){
throw new UnsupportedOperationException("This method is not supported.");   ~124
}
...
}
```

| CLASS NAME | INTERFACE NAME | TYPE OF INCOMPATIBILITY | NOTIFICATION MESSAGE | CORRECTION RULE |
|---|---|---|---|---|
| A | XXX_EVENT | not_notified | THIS EVENT IS NOT NOTIFIED. | |
| A | public void setX(Object obj) | unsupported | THIS METHOD IS UNSUPPORTED. FOR THE APPLICATION USING THIS METHOD, PLEASE MAKE CORRECTION SO THAT IT USES setY METHOD OF class B. | around B#setY(Object obj) |
| | | | | |
| | | | | |

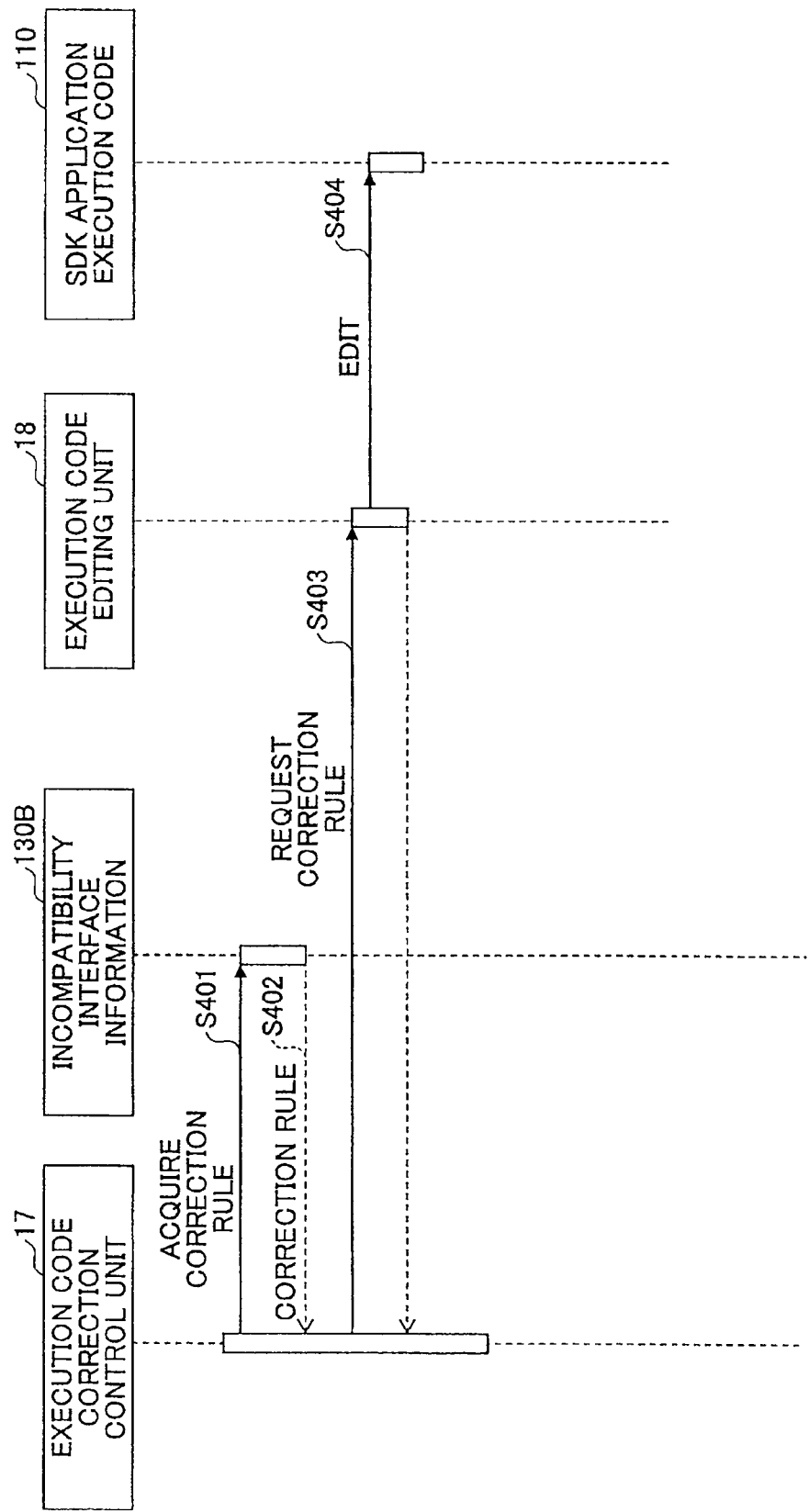

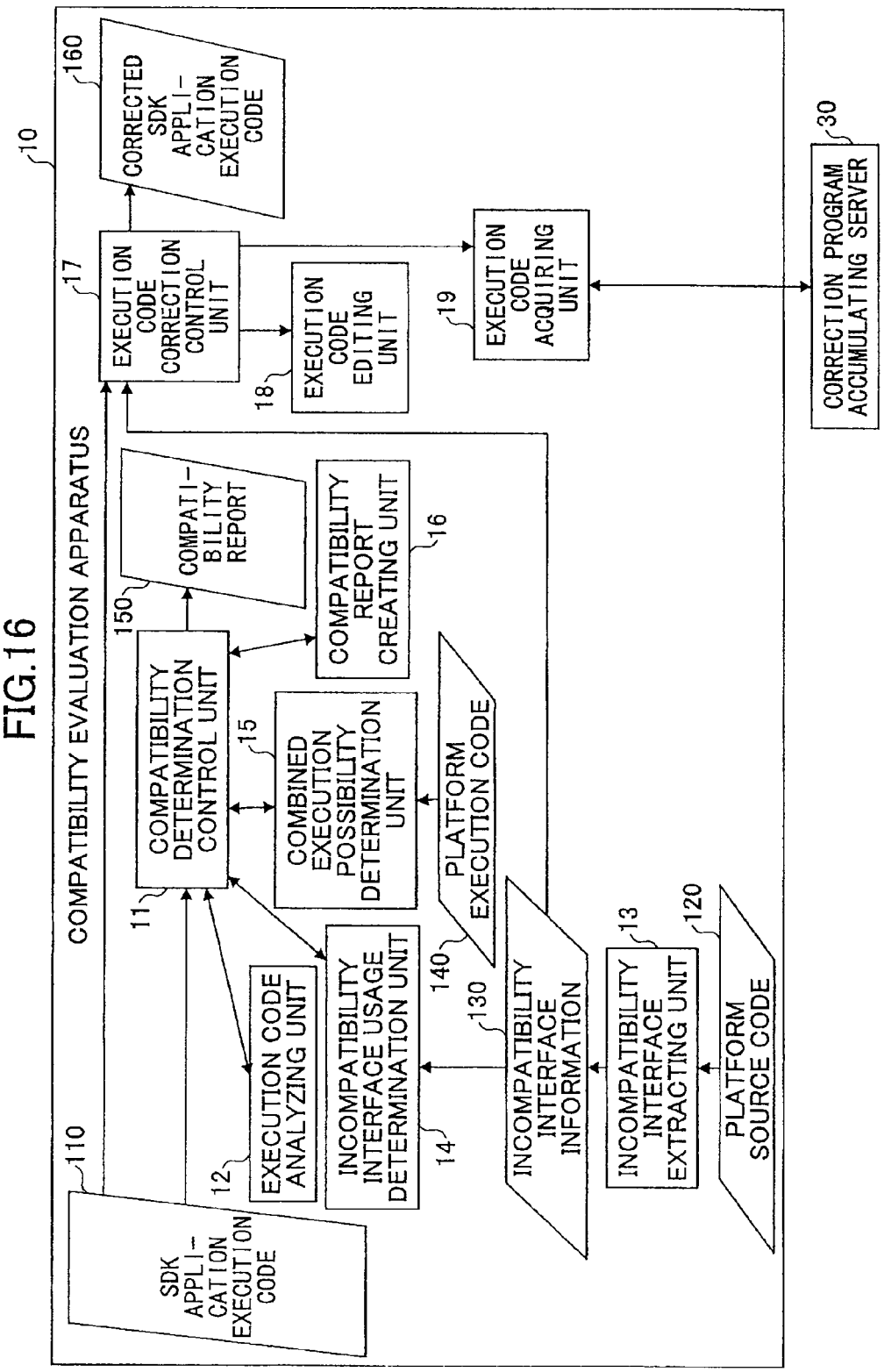

FIG.17

```
class A {
  /**
   * @not_notified THIS EVENT IS NOT NOTIFIED.
   */
  public static final JobEvent XXX_EVENT = new A(XXX);

/**
   * RETURN VALUE OF X.
   * <BR>
   * THIS CONSTRUCTOR IS UNSUPPORTED.
   * @unsupported (rule = download Patch001.class, around Patch001#setX(Object obj))
   *              THIS METHOD IS UNSUPPORTED.
   *              PLEASE MAKE CORRECTION TO USE set X OF Patch001.
   **/
  public void setX(Object obj){
    throw new UnsupportedOperationException("This method is not supported.");
  }
}
```

| CLASS NAME | INTERFACE NAME | TYPE OF INCOMPATIBILITY | NOTIFICATION MESSAGE | CORRECTION RULE |
|---|---|---|---|---|
| A | XXX_EVENT | not_notified | THIS EVENT IS NOT NOTIFIED. | |
| A | public void setX(Object obj) | unsupported | THIS METHOD IS UNSUPPORTED. PLEASE MAKE CORRECTION TO USE setX OF Patch001. | download Patch001.class around Patch001#setX(Object obj) |
| | | | | |
| | | | | |

130C

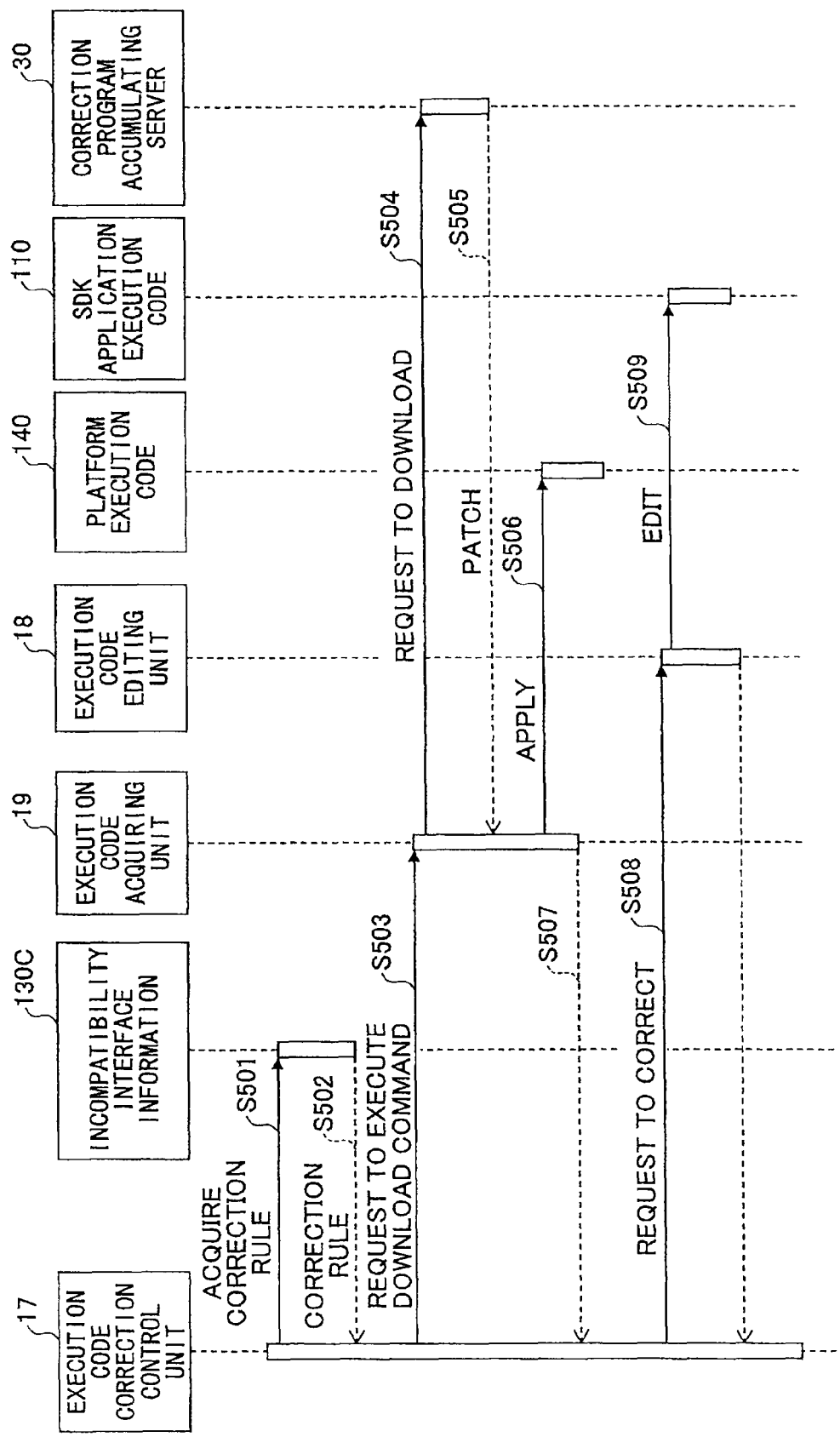

COMPATIBILITY EVALUATION APPARATUS, COMPATIBILITY EVALUATION METHOD, AND RECORDING MEDIUM

BACKGROUND OF THE INVENTION

1. Field of the Invention

The present invention relates to a compatibility evaluation apparatus, a compatibility evaluation method, and a recording medium, and more particularly to a compatibility evaluation apparatus, a compatibility evaluation method, and a recording medium for evaluating an application in terms of incompatibility with a platform.

2. Description of the Related Art

Conventionally, an image forming apparatus, which is typically referred to as a multifunction peripheral, has a platform program (hereinafter, also simply referred to as a "program") for operating an application program (hereinafter, also simply referred to as an "application"). The platform may provide an API (Application Program Interface) that is made available to the public (see, for example, Japanese Laid-Open Patent Application No. 2005-269619). For such an image forming apparatus, an external software vendor other than the manufacturer of the image forming apparatus may develop a new application.

The cycle of releasing such a platform is becoming shorter; for example, an upgraded version is released every six months. Every time an upgraded version is released, the above-described API is added. Thus, there may be an incompatibility between different APIs, e.g., the API on the platform of an old version and the API on the platform of a new version.

A common API may be used for different machine types of image forming apparatuses. However, the behaviors of the APIs used in the different machine types may not be completely the same if the different machine types have different hardware resources. Thus, there may be an incompatibility among different machine types in terms of the behaviors of the APIs.

When there is such an incompatibility between APIs, the developer of an application may not be able to guarantee the operations of the application for all versions of the platform and all of the different machine types. Furthermore, when there are multiple platforms, a significant burden may be inflicted on the platform provider.

Specifically, when there are multiple platforms, it is a tremendous burden on an application developer to evaluate (test) the operation of the application on all of the multiple platforms including combinations of platform versions and different machine types.

Furthermore, when an unexpected operation is executed in the process of evaluating the application, the application developer may need to contact the platform provider. In the market, there are a vast variety of applications and multiple platforms. Therefore, the platform provider may be contacted by a large number of application developers, which may lead to a tremendous burden on the platform provider.

One approach is to evaluate an application in terms of incompatibility with a platform with the use of the technology described in Japanese Patent Application Publication No. 2001-518658.

However, with the technology described in Japanese Patent Application Publication No. 2001-518658, it is necessary to describe definition information in a predetermined definition language for all interfaces made available to the public by the platform provider. Given that platforms are upgraded frequently as described above, it is a tremendous burden on the platform provider to describe the definition information of all interfaces.

SUMMARY OF THE INVENTION

The present invention provides a compatibility evaluation apparatus, a compatibility evaluation method, and a recording medium, in which one or more of the above-described disadvantages are eliminated.

A preferred embodiment of the present invention provides a compatibility evaluation apparatus, a compatibility evaluation method, and a recording medium for efficiently evaluating application programs in terms of incompatibility with a platform program.

According to an aspect of the present invention, there is provided a compatibility evaluation apparatus for evaluating compatibility between a platform program and an application program that uses interfaces provided by the platform program, the compatibility evaluation apparatus including an application analyzing unit configured to analyze the application program and extract a list of the interfaces used by the application program; an incompatibility interface usage determination unit configured to extract, from the list of the interfaces used by the application program, an interface that corresponds to an incompatible interface that does not satisfy a specification, the interface being extracted with the use of a first storage unit storing information indicating contents of incompatibility for each of the incompatible interfaces among the interfaces provided by the platform; and a compatibility report creating unit configured to record, in a second storage unit, the information indicating contents of incompatibility for each interface that has been extracted by the incompatibility interface usage determination unit.

According to an aspect of the present invention, there is provided a compatibility evaluation method executed by a computer for evaluating compatibility between a platform program and an application program that uses interfaces provided by the platform program, the compatibility evaluation method including an application analyzing step of analyzing the application program and extracting a list of the interfaces used by the application program; an incompatibility interface usage determination step of extracting, from the list of the interfaces used by the application program, an interface that corresponds to an incompatible interface that does not satisfy a specification, the interface being extracted with the use of a first storage unit storing information indicating contents of incompatibility for each of the incompatible interfaces among the interfaces provided by the platform; and a compatibility report creating step of recording, in a second storage unit, the information indicating contents of incompatibility for each interface that has been extracted at the incompatibility interface usage determination step.

According to an aspect of the present invention, there is provided a computer-readable recording medium recording a program that causes a computer to execute a procedure for evaluating compatibility between a platform program and an application program that uses interfaces provided by the platform program, the procedure including an application analyzing step of analyzing the application program and extracting a list of the interfaces used by the application program; an incompatibility interface usage determination step of extracting, from the list of the interfaces used by the application program, an interface that corresponds to an incompatible interface that does not satisfy a specification, the interface being extracted with the use of a first storage unit storing information indicating contents of incompatibility for each of the incompatible interfaces among the interfaces provided by the platform; and a compatibility report creating step of recording, in a second storage unit, the information indicating contents of incompatibility for each interface that has been extracted at the incompatibility interface usage determination step.

According to one embodiment of the present invention, a compatibility evaluation apparatus, a compatibility evaluation method, and a recording medium are provided, which are capable of efficiently evaluating application programs in terms of incompatibility with a platform program.

BRIEF DESCRIPTION OF THE DRAWINGS

Other objects, features and advantages of the present invention will become more apparent from the following detailed description when read in conjunction with the accompanying drawings, in which:

FIG. 4 is a sequence diagram for describing a process of generating incompatibility interface information;

FIG. 5 illustrates an example of a platform source code according to the first embodiment;

FIG. 6 illustrates an example of incompatibility interface information according to the first embodiment;

FIG. 8 illustrates an example of the interface list;

FIG. 13 illustrates an example of a platform source code according to the second embodiment;

FIG. 14 illustrates an example of incompatibility interface information according to the second embodiment;

FIG. 15 is a sequence diagram for describing a process of correcting an incompatible part according to the second embodiment;

FIG. 16 illustrates a functional block diagram of the compatibility evaluation apparatus according to a third embodiment of the present invention;

FIG. 17 illustrates an example of a platform source code according to the third embodiment;

FIG. 18 illustrates an example of incompatibility interface information according to the third embodiment; and FIG. 19 is a sequence diagram for describing a process of correcting an incompatible part according to the third embodiment.

DETAILED DESCRIPTION OF THE PREFERRED EMBODIMENTS

A description is given, with reference to the accompanying drawings, of embodiments of the present invention.

Figure 1:
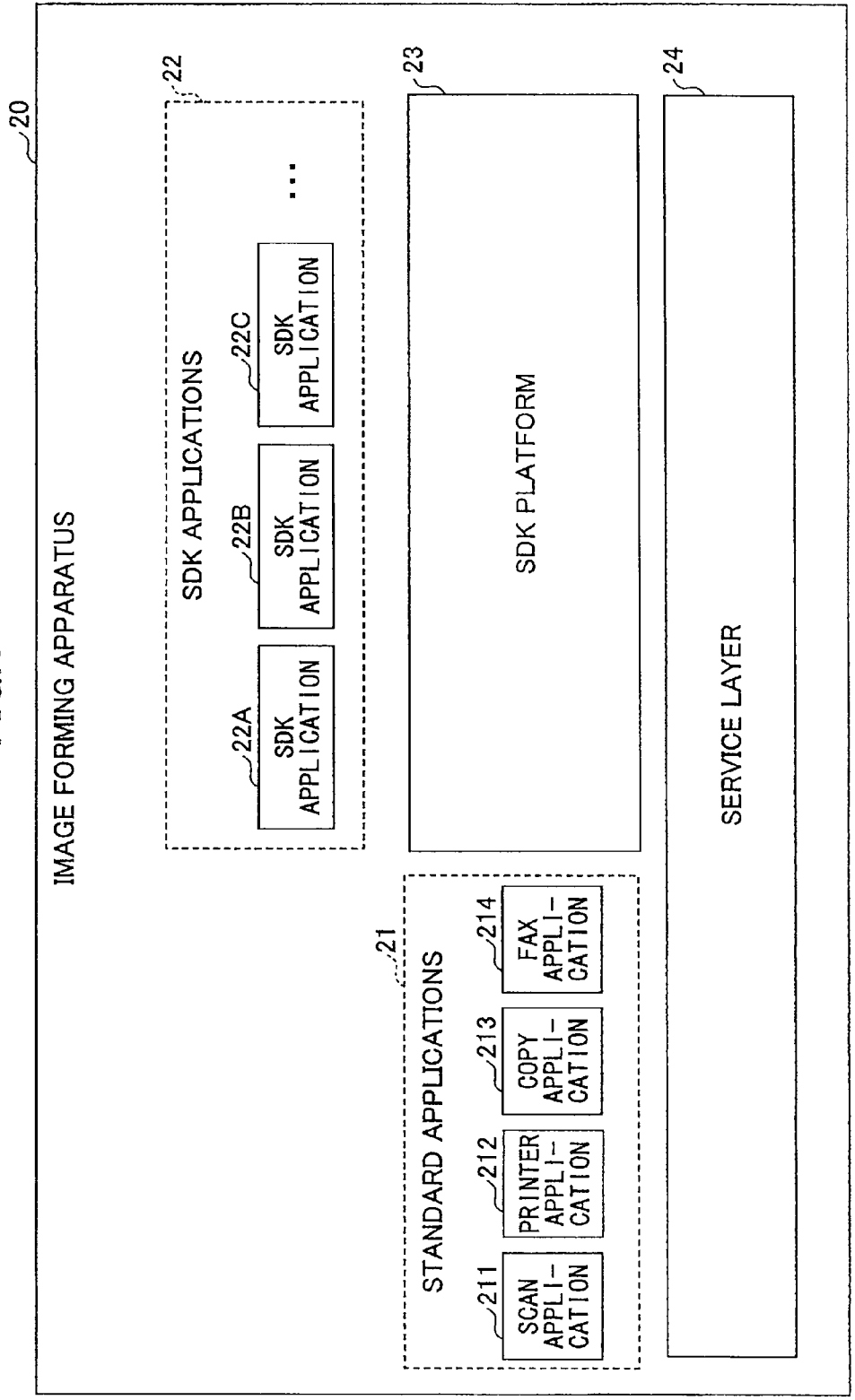
FIG. 1 illustrates programs that are targets of compatibility evaluation according to an embodiment of the present invention.

FIG. 1 illustrates programs that are targets of compatibility evaluation according to an embodiment of the present invention. In the present embodiment, programs in an image forming apparatus 20 are the targets of compatibility evaluation.

The image forming apparatus 20 includes software resources such as standard applications 21, SDK applications 22, an SDK platform 23, and a service layer 24.

The standard applications 21 are pre-installed in the image forming apparatus 20 as standard equipment (the image forming apparatus 20 is shipped with the standard applications 21). The examples of the standard applications 21 shown in FIG. 1 are a scan application 211, a printer application 212, a copy application 213, and a fax application 214. The scan application 211 executes a scan job. The printer application 212 receives print data via a network and executes a print job based on the received print data. Specifically, the print data is transmitted to a print port of the image forming apparatus 20, and is then processed by the printer application 212. The copy application 213 executes a copy job. The fax application 214 executes a fax transmitting job or a fax receiving job.

The service layer 24 provides an upper-level application with management functions, such as control functions and management information of various hardware resources.

The SDK applications 22 are application programs that are additionally installed in the image forming apparatus 20 after shipment, as plug-ins for expanding functions of the image forming apparatus 20. As shown in FIG. 1, examples of the SDK applications 22 are an SDK application 22A, an SDK application 22B, and an SDK application 22C.

The SDK platform 23 is a program or a group of programs for providing an execution environment for the SDK applications 22. The SDK applications 22 are operated on the SDK platform 23. The SDK applications 22 may use (execute) various functions of the image forming apparatus 20 through an API (Application Program Interface), which is provided (made available to the public) by the SDK platform 23. For example, the API (hereinafter, "SDKAPI") may include an interface for using the scan function, an interface for using the print function, and an interface for using the copy function. Each of the SDK applications 22 may use one or more interfaces.

Contents of the SDK platform 23 may vary according to the version of the platform or the machine type of the image forming apparatus 20 in which the SDK platform 23 is installed (i.e., there may be incompatible parts). A state where there is compatibility among different versions of the SDK platform 23 is referred to as "version-dependent compatibility". A state where there is no compatibility among different versions of the SDK platform 23 is referred to as "version-dependent incompatibility". An example of version-dependent incompatibility is when a new SDKAPI is added with a new version of the SDK platform 23.

A state where there is compatibility among different machine types in which the SDK platform 23 is installed is referred to as "machine type-dependent compatibility". A state where there is no compatibility among different machine types in which the SDK platform 23 is installed is referred to as "machine type-dependent incompatibility". An example of machine type-dependent incompatibility is when the same SDK platform 23 is installed in different machine types (machine type A and machine type B), but a method A of the SDK platform 23 in machine type A and a method A of the SDK platform 23 in machine type B have different behaviors.

In the present embodiment, a description is given of a compatibility evaluation apparatus, a compatibility evaluation method, and a recording medium for evaluating whether the SDK application 22 developed on a certain version of the SDK platform 23 can properly operate in another version of the SDK platform 23, or in the SDK platform 23 installed in another machine type.

Figure 2:
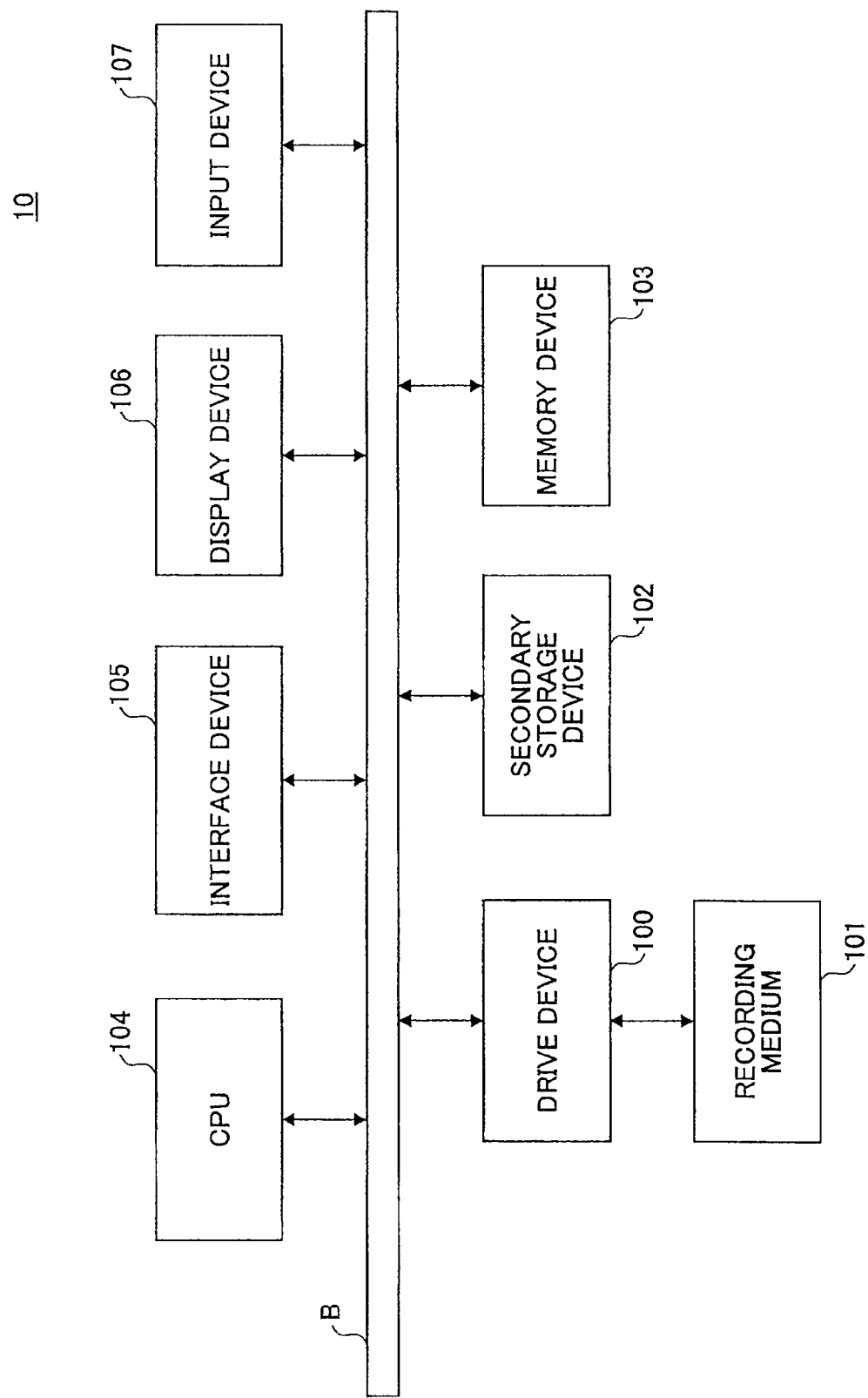
FIG. 2 illustrates a hardware configuration of a compatibility evaluation apparatus according to an embodiment of the present invention.

FIG. 2 illustrates a hardware configuration of a compatibility evaluation apparatus 10 according to an embodiment of the present invention. As shown in FIG. 2, the compatibility evaluation apparatus 10 includes a drive device 100, a secondary storage device 102, a memory device 103, a CPU 104, an interface device 105, a display device 106, and an input device 107, which are connected to each other by a bus B.

A program for implementing a process in the compatibility evaluation apparatus 10 is provided in a recording medium 101 such as a CD-ROM. When the recording medium 101 storing a program is set in the drive device 100, the program is installed into the secondary storage device 102 from the recording medium 101 via the drive device 100. However, the program need not be installed from the recording medium 101; the program may be downloaded from another computer via a network. The secondary storage device 102 stores the installed program as well as necessary files and data.

The memory device 103 reads a program from the secondary storage device 102 and loads the program, when there is an instruction to activate the program. The CPU 104 implements functions relevant to the compatibility evaluation apparatus 10 according to the program loaded in the memory device 103. The interface device 105 is used as an interface for connecting the compatibility evaluation apparatus 10 to a network. The display device 106 displays a GUI (Graphical User Interface) in accordance with a program. The input device 107 includes a keyboard and a mouse, and is used for inputting various operating instructions.

Figure 3:
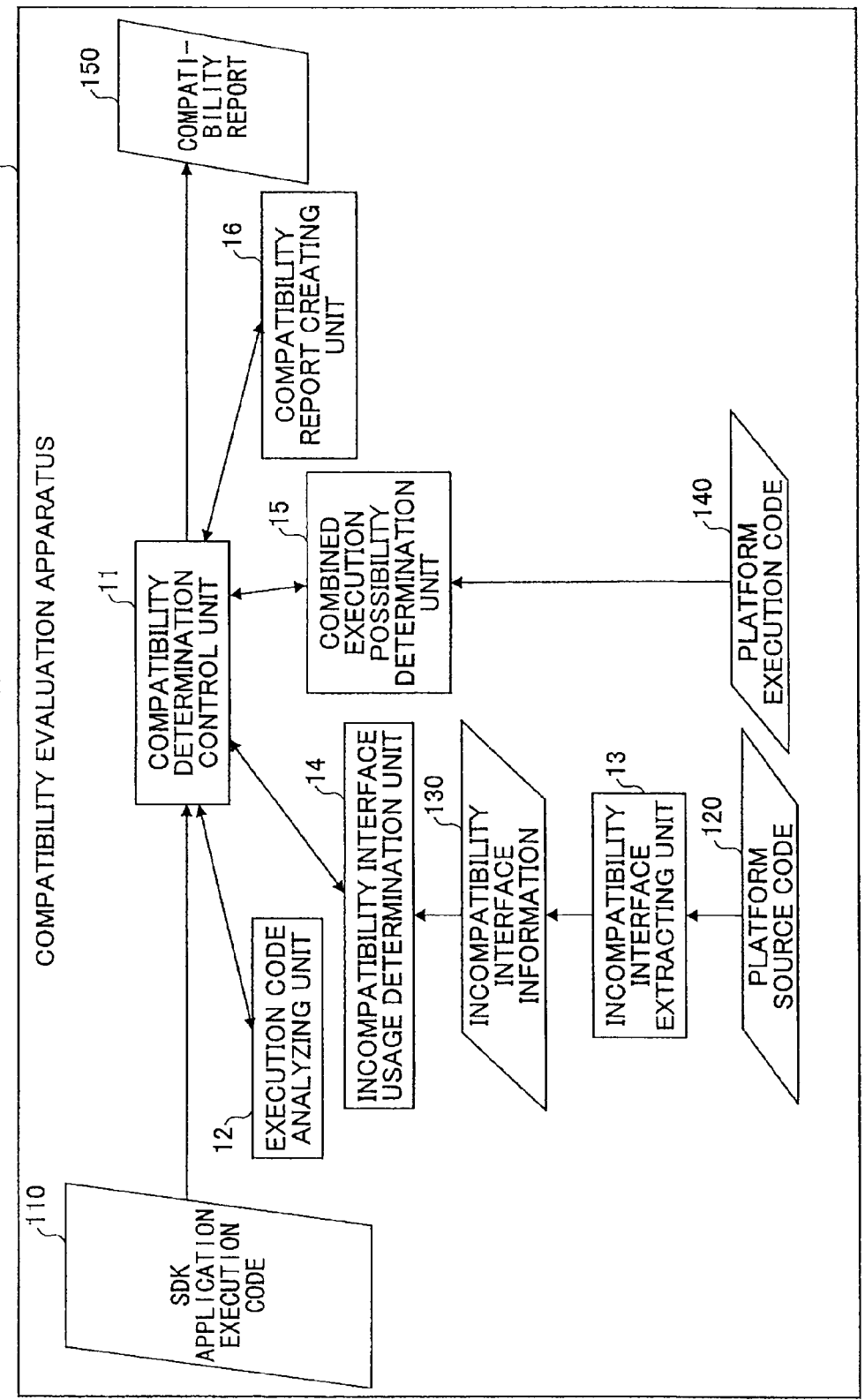
FIG. 3 illustrates a functional configuration of the compatibility evaluation apparatus according to a first embodiment of the present invention.

FIG. 3 illustrates a functional configuration of the compatibility evaluation apparatus 10 according to a first embodiment of the present invention. As shown in FIG. 3, the compatibility evaluation apparatus 10 includes a compatibility determination control unit 11, an execution code analyzing unit 12, an incompatibility interface extracting unit 13, an incompatibility interface usage determination unit 14, a combined execution possibility determination unit 15, and a compatibility report creating unit 16. These units are implemented as programs installed in the compatibility evaluation apparatus 10 are executed by the CPU 104.

The compatibility determination control unit 11 controls the process of determining whether there is compatibility between the SDK application 22 that is selected as an evaluation target (hereinafter, "evaluation target application") and the SDK platform 23 that is selected as an evaluation target (hereinafter, "evaluation target platform").

The execution code analyzing unit 12 analyzes an SDK application execution code 110, and generates a list (hereinafter, "interface list") of methods or events of the SDKAPI that is called (used) in the SDK application execution code 110. The SDK application execution code 110 is an execution code (also referred to as an execution object) of the evaluation target application. For example, when the SDK application 22 is described in Java (registered trademark), the SDK application execution code 110 is a JAR (Java (registered trademark) Archive) including a Java (registered trademark) byte code or class file. However, this does not mean that the evaluation target according to the present embodiment is limited to a program described in the Java (registered trademark) language. For example, when the program is described in a C language or a C++ language, the SDK application execution code 110 may be an object file. Furthermore, regardless of the programming language, a source code of an evaluation target application may be used as the analysis target of the execution code analyzing unit 12, instead of the SDK application execution code 110. A source code may be analyzed to determine whether a method of SDKAPI is being called. The SDK application 22 may be calling for a standard function or class method in the programming language. The SDK application 22 may be calling for a function or class method that is uniquely defined. The function or method and SDKAPI may be distinguished based on the function name or method name. For example, if the class or method has a name according to a predetermined command rule (relevant to a predetermined package name in the case of Java (registered trademark)), it is determined to be SDKAPI.

The incompatibility interface extracting unit 13 extracts incompatibility interface information 130 from a platform source code 120 of the evaluation target platform. The incompatibility interface information 130 is a list of methods corresponding to machine-type dependent incompatible parts, with respect to the evaluation target platform. The list also includes information indicating the incompatibility of the evaluation target platform with respect to a specification (proper behavior) of the version of the evaluation target platform. For example, when the specification of the corresponding version defines a method for executing Z fold, but the evaluation target platform is the SDK platform 23 for a machine type without hardware resources to perform Z fold, the method of the evaluation target platform does not satisfy the specification of "executing Z fold". Such information is included in the incompatibility interface information 130.

The incompatibility interface usage determination unit 14 extracts, from the incompatibility interface information 130, information corresponding to methods included in the interface list generated by the execution code analyzing unit 12. Specifically, the incompatibility interface usage determination unit 14 extracts a list of methods corresponding to the machine type-dependent incompatibility parts of the evaluation target platform, from among methods used by the evaluation target platform.

The combined execution possibility determination unit 15 determines whether there is a method that is not included in the evaluation target platform, from among the methods included in the interface list generated by the execution code analyzing unit 12. That is to say, the combined execution possibility determination unit 15 determines whether there is version-dependent incompatibility. The combined execution possibility determination unit 15 acquires the list of methods included in the evaluation target platform by analyzing a platform execution code 140. The combined execution possibility determination unit 15 may analyze the platform source code 120.

The platform execution code 140 is an execution code of the evaluation target platform, which is generated by compiling platform sources. There is one platform execution code 140 for each version and operating environment (machine type) of the SDK platform 23.

The compatibility report creating unit 16 creates a report (evaluation information) regarding the compatibility of the evaluation target application operated on the evaluation target platform. The report is created based on the determination result relevant to machine type-dependent incompatibility of the incompatibility interface usage determination unit 14 and the determination result relevant to version-dependent incompatibility of the combined execution possibility determination unit 15.

The SDK application execution code 110, the platform source code 120, and the platform execution code 140 may be recorded in the secondary storage device 102 of the compatibility evaluation apparatus 10 or in a storage device that can be accessed by the compatibility evaluation apparatus 10 via a network. Alternatively, the SDK application execution code 110, the platform source code 120, and the platform execution code 140 may be recorded in a portable recording medium such as a CD-ROM.

A description is given of the process of the compatibility evaluation apparatus 10. FIG. 4 is a sequence diagram for describing the process of generating incompatibility interface information.

For example, in response to an instruction input by a user (evaluator or test execution person), the incompatibility interface extracting unit 13 extracts the incompatibility interface information 130 from the platform source code 120 (step S101 and S102).

FIG. 5 illustrates an example of a platform source code according to the first embodiment of the present invention. In the present embodiment, as a matter of convenience, it is assumed that the SDK platform 23 is described in Java (registered trademark).

A platform source code 120A in FIG. 5 is an example of a source code relevant to class A. As shown in FIG. 5, the platform source code 120A includes a definition 122 relevant to an event "XXX_EVENT", and a definition 124 relevant to a method "setX". Incompatibility information (information relevant to incompatibility) about the incompatible parts is described in the descriptions. For example, a description 121 is incompatibility information concerning the definition 122. Specifically, the description 121 includes a message indicating that this event (XXX_EVENT) is not notified (in the SDK platform 23). Furthermore, a description 123 is incompatibility information with respect to the definition 124. Specifically, the description 123 includes a message indicating that this method is not supported (in the SDK platform 23), and prompting the user to make a correction so that the application (SDK application 22) using this method uses a method "set Y" of class B (instead of this method). A character string (hereinafter, "incompatibility tag"), which is for identifying that the corresponding description is incompatibility information, is attached to the description 121 and the description 123 in a predetermined format. Specifically, "@not_notified" in the description 121 and "@unsupported" in the description 123 are incompatibility tags. In the present embodiment, the incompatibility tag is a character string beginning with "@". Furthermore, the tag name of the incompatibility tag indicates the type of incompatibility or a meaning. For example, "not_notified" indicates that there is incompatibility in that a corresponding event is not notified/reported. In another example, "unsupported" indicates that there is incompatibility in that a corresponding method is not supported. In the present embodiment, there is a clear distinction between a method that is not supported and a method that does not exist. When a method is not supported, it means that the method exists but a process that satisfies the specification cannot be executed.

The types of incompatibility (incompatibility types) shown in FIG. 5 are merely examples; any type of incompatibility may be defined according to need depending on the type or extent of incompatibility.

The incompatibility interface extracting unit 13 detects the incompatibility tag in the platform source code 120A, and extracts the incompatibility interface information 130 including information items that are associated with each other. Examples of the information items included in the incompatibility interface information 130 are a tag name of the incompatibility information, a character string (notification message) described next to the incompatibility tag, a definition element name (hereinafter, "interface name") such as a method name or an event name in which the incompatibility has been detected, and a class name in which the incompatibility has been detected.

Next, the incompatibility interface extracting unit 13 converts the extracted incompatibility interface information 130 into a predetermined format, and saves the incompatibility interface information 130 in the secondary storage device 102 (step S103).

FIG. 6 illustrates an example of incompatibility interface information 130 according to the first embodiment. Incompatibility interface information 130A shown in FIG. 6 includes a class name, an interface name, an incompatibility type, and a notification message, for each method extracted as an incompatible part. FIG. 6 illustrates an example of the incompatibility interface information 130 that has been extracted from the platform source code 120A of FIG. 5. Specifically, the first line is extracted based on the description 121 and the second line is extracted based on the description 123. As clearly seen by comparing FIGS. 5 and 6, a class name of a class (in which the incompatibility tag has been detected) existing in the incompatibility part (incompatibility interface) is recorded as the class name. A name of a method or an event that is an incompatibility interface is recorded as the interface name. The tag name of the incompatibility tag is recorded as the incompatibility type. A character string described next to the incompatibility tag is recorded as the notification message.

In the process of extracting the incompatibility interface information 130 described above, it is assumed that incompatibility information is described in the platform source code 120 by the developer of the SDK platform 23. The incompatibility information does not necessarily need to be described in the platform source code 120. The incompatibility information may be described in a file that is managed in association with the platform source code 120. The association may be made by incorporating a class name of a class including the incompatibility interface, into the file name of a file in which only the incompatibility information is described. In another example, the association may be made by combining (archiving) the file in which the incompatibility information is separately described, with a source file of a class including an incompatibility interface. Contents of a file in which the incompatibility information is separately described may be the same as the incompatibility interface information 130. In this case, it is not necessary to perform the process of extracting the incompatibility interface information 130.

Figure 7:
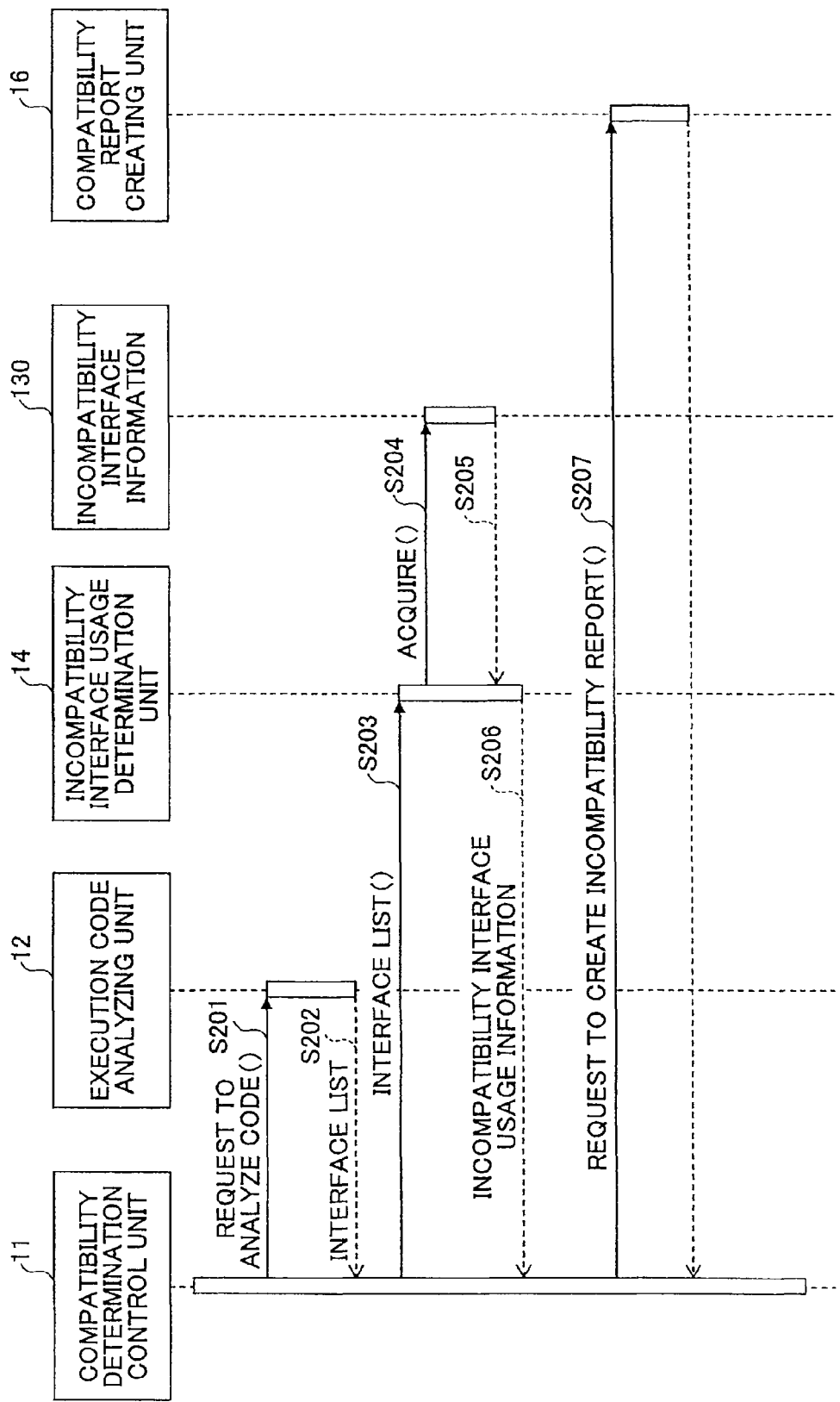
FIG. 7 is a sequence diagram for describing an evaluation process regarding machine type-dependent compatibility.

Next, a description is given of an evaluation process regarding machine type-dependent compatibility. FIG. 7 is a sequence diagram for describing an evaluation process regarding machine type-dependent compatibility.

For example, when a user specifies an evaluation target application and inputs an evaluation request regarding machine type-dependent compatibility, the compatibility determination control unit 11 requests the execution code analyzing unit 12 to analyze the SDK application execution code 110 of the evaluation target application (step S201). The execution code analyzing unit 12 analyzes the SDK application execution code 110 and extracts one or more interfaces (methods, events, etc.) used by the SDK application execution code 110. The execution code analyzing unit 12 returns a list of extracted interfaces to the compatibility determination control unit 11 as an interface list (step S202). The list of interfaces may include one or more interfaces (methods, events, etc.).

FIG. 8 illustrates an example of the interface list. As shown in FIG. 8, the interface list includes a class name and an interface name for each of the extracted interfaces. As shown in the example of FIG. 8, the SDK application execution code 110 uses a set X method of class A, a set Y method of class C, and a set Z method of class C. The interface list may include any kind of information as long as the interface (method, event, etc.) can be identified according to the programming language. For example, when the language is not an object-oriented programming language, there is no need for a class name. Meanwhile, when it is allowed to have classes having the same class names by defining name spaces, name space names are to be included in the interface list.

Next, the compatibility determination control unit 11 inputs the interface list in the incompatibility interface usage determination unit 14 (step S203). The incompatibility interface usage determination unit 14 acquires the incompatibility interface information 130, which has been generated in advance according to the process of FIG. 4 and saved in a predetermined location in the secondary storage device 102 (steps S204 and S205). Next, the incompatibility interface usage determination unit 14 extracts, from the incompatibility interface information 130, information relevant to the interface included in the input interface list, and returns the extracted information (incompatibility interface usage information) to the compatibility determination control unit 11 (step S206). For example, when the incompatibility interface information 130 of FIG. 6 and the interface list of FIG. 8 are process targets, the incompatibility interface usage determination unit 14 extracts information (a line) relevant to the set X method of class A in the incompatibility interface information 130. When no corresponding information can be extracted, the incompatibility interface usage determination unit 14 returns a response to the compatibility determination control unit 11 indicating that there is no corresponding information. That is to say, the incompatibility interface usage determination unit 14 may extract zero or one or more information items.

When the incompatibility interface usage determination unit 14 returns incompatibility interface usage information, the compatibility determination control unit 11 inputs the incompatibility interface usage information in the compatibility report creating unit 16, and requests the compatibility report creating unit 16 to create a compatibility report 150 (step S207). The compatibility report creating unit 16 creates the compatibility report 150 based on the incompatibility interface usage information and saves the created compatibility report 150 in the secondary storage device 102.

Figure 9:
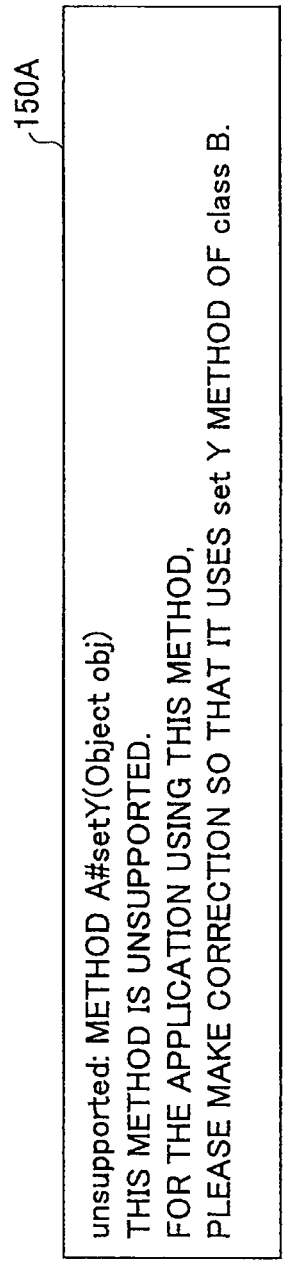
FIG. 9 illustrates an example of a compatibility report relevant to machine type-dependent incompatibility.

FIG. 9 illustrates an example of the compatibility report relevant to machine type-dependent incompatibility. As shown in FIG. 9, a compatibility report 150A records an incompatibility type, an interface name, and a notification message of an interface included in the incompatibility interface usage information. The user can easily be aware of any problems relevant to machine type-dependent incompatibility when an evaluation target application is operated on an evaluation target platform, by causing the display device 106 to display the compatibility report 150A or by printing out the compatibility report 150A with a printer (not shown). Furthermore, the user can take appropriate measures to solve such problems. For example, with reference to FIG. 9, the user may replace the portion calling for a set Y method of class A in the source code of the evaluation target application with a set Y method of class B. As a result, the evaluation target application can be appropriately operated on the evaluation target platform.

Figure 10:
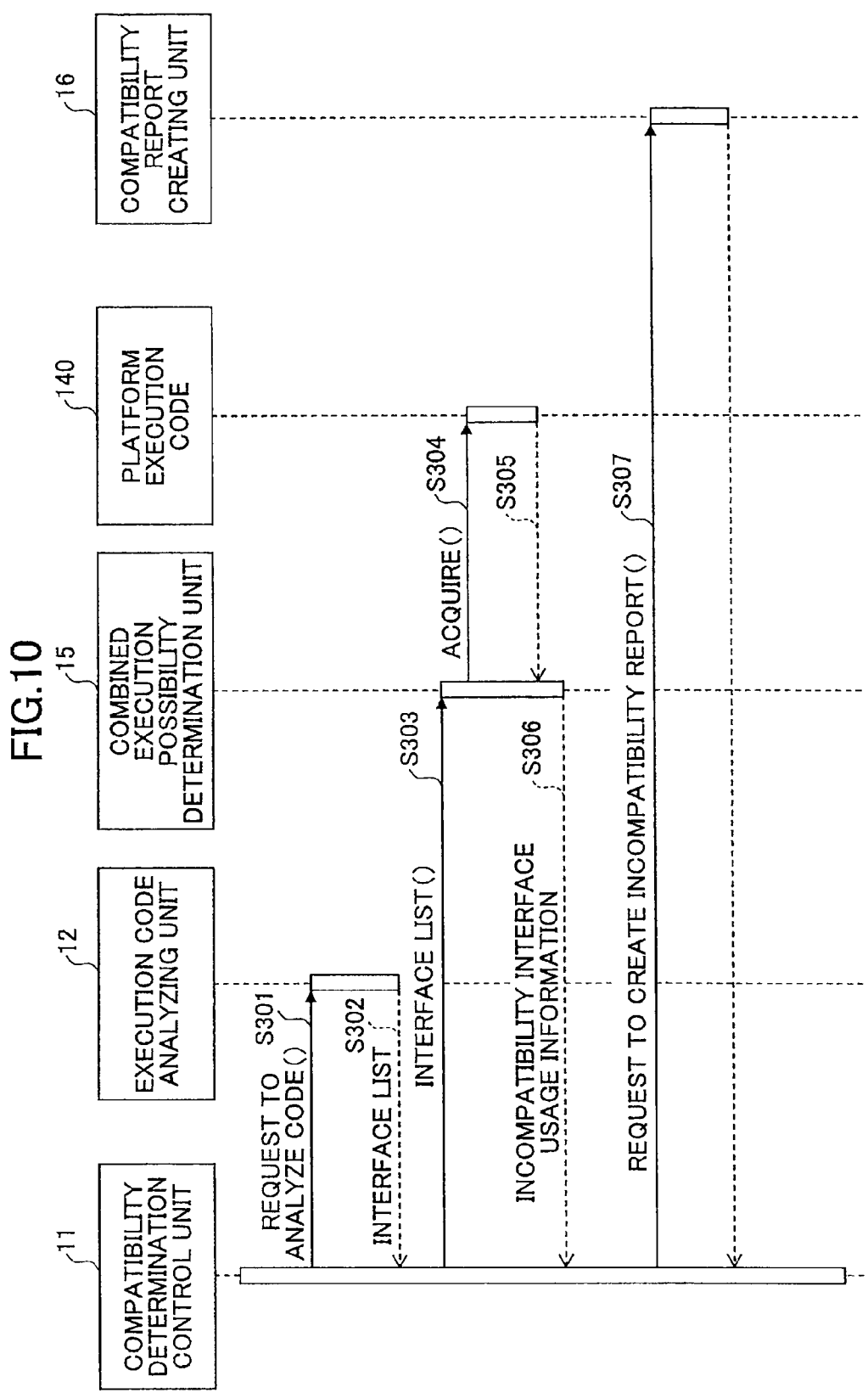
FIG. 10 is a sequence diagram for describing an evaluation process regarding version-dependent compatibility.

Next, a description is given of an evaluation process regarding version-dependent compatibility. FIG. 10 is a sequence diagram for describing an evaluation process regarding version-dependent compatibility.

For example, when a user specifies an evaluation target program and an evaluation target platform, and inputs an evaluation request regarding version-dependent compatibility, the compatibility determination control unit 11 requests the execution code analyzing unit 12 to analyze the SDK application execution code 110 of the evaluation target application (step S301). The process performed by the execution code analyzing unit 12 is the same as that described with reference to FIG. 7 (evaluation process regarding machine type-dependent compatibility). Thus, in step S302, an interface list such as that illustrated in FIG. 8 is returned to the compatibility determination control unit 11.

Next, the compatibility determination control unit 11 inputs the interface list in the combined execution possibility determination unit 15 (S303). The combined execution possibility determination unit 15 acquires the platform execution code 140 that is saved in advance in a predetermined location in the secondary storage device 102 (steps S304 and S305). Next, the combined execution possibility determination unit 15 analyzes the platform execution code 140, and extracts (lists), from among interfaces included in the input interface list, interfaces that do not exist in the platform execution code 140 (i.e., interfaces in the platform execution code 140 that cannot be combined (cannot be linked) with the SDK application 22 when the SDK application 22 is executed). The combined execution possibility determination unit 15 returns the list of extracted interfaces (for example, a list of interface names) to the compatibility determination control unit 11 (step S306). When no corresponding interface can be extracted, the combined execution possibility determination unit 15 returns a response to the compatibility determination control unit 11 indicating that there is no corresponding interface. That is to say, the combined execution possibility determination unit 15 may extract zero or one or more interfaces.

When the combined execution possibility determination unit 15 returns a list of interfaces, the compatibility determination control unit 11 inputs the list of interfaces in the compatibility report creating unit 16, and requests the compatibility report creating unit 16 to create a compatibility report 150 (step S307). The compatibility report creating unit 16 creates the compatibility report 150 based on the list of interfaces and saves the created compatibility report 150 in the secondary storage device 102.

Figure 11:
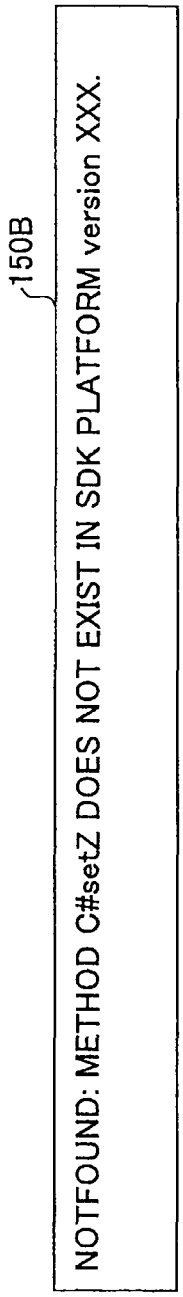
FIG. 11 illustrates an example of a compatibility report relevant to version-dependent incompatibility.

FIG. 11 illustrates an example of the compatibility report relevant to version-dependent incompatibility. As shown in FIG. 11, a compatibility report 150B indicates that a set Z method of class C does not exist in the evaluation target platform. The user can easily be aware of any problems relevant to version-dependent incompatibility when an evaluation target application is operated on an evaluation target platform, by causing the display device 106 to display the compatibility report 150B or by printing the compatibility report 150B with a printer (not shown).

In the above descriptions, the evaluation regarding machine type-dependent compatibility and the evaluation regarding version-dependent compatibility are executed separately. However, both evaluations may be executed together. In this case, steps S303 through S306 of FIG. 10 are executed between steps S202 and S203 of FIG. 7, or between steps S206 and S207 of FIG. 7. The compatibility report creating unit 16 generates the compatibility report 150 based on the incompatibility interface usage information extracted by the incompatibility interface usage determination unit 14 and the list of interfaces extracted by the combined execution possibility determination unit 15. The resultant compatibility report 150 is a combination of FIGS. 9 and 11.

As described above, according to the first embodiment, the compatibility evaluation apparatus 10 can efficiently evaluate the SDK application 22 in terms of incompatibility with the SDK platform 23. That is to say, according to the present embodiment, the incompatibility interface information 130 is automatically extracted from the platform source code 120, and a list of interfaces that do not exist is automatically extracted based on the incompatibility interface information 130. Therefore, there is no need to describe the definition information of all interfaces of the SDK platform 23. Even in a case where the user is required to create the incompatibility interface information 130 in advance, the target interfaces are limited to incompatible interfaces. Therefore, the user's workload can be significantly reduced compared to the case of creating definition information for all interfaces.

Figure 12:
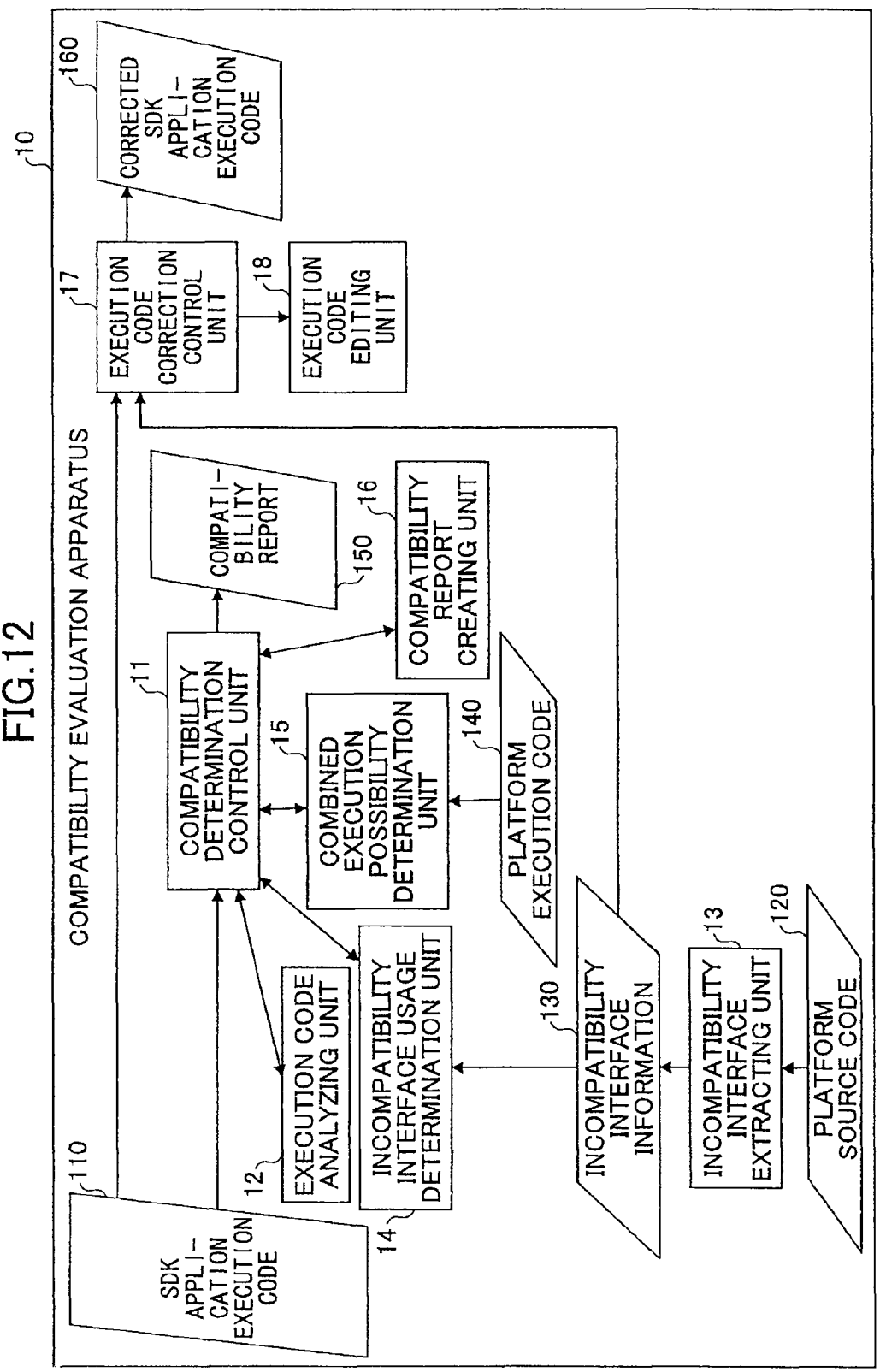
FIG. 12 illustrates a functional configuration of the compatibility evaluation apparatus according to a second embodiment of the present invention.

Next, a description is given of a second embodiment of the present invention. FIG. 12 illustrates a functional configuration of the compatibility evaluation apparatus 10 according to the second embodiment of the present invention. In FIG. 12, elements corresponding to those in FIG. 3 are denoted by the same reference numerals and are not further described.

In the second embodiment, an execution code correction control unit 17 and an execution code editing unit 18 are added. The execution code correction control unit 17 controls a correction process for eliminating the incompatibility when the SDK application execution code 110 is using an incompatible interface. The execution code editing unit 18 edits the SDK application execution code 110 to eliminate the incompatibility.

FIG. 13 illustrates an example of a platform source code according to the second embodiment. In FIG. 13, elements corresponding to those in FIG. 5 are denoted by the same reference numerals and are not further described. In a platform source code 120B shown in FIG. 13, a rule attribute is attached to an incompatibility tag (@unsupported) in a description 123B. That is to say, a value of a rule attribute "around B#setY(Object obj)" indicates a correction rule (correction method) for eliminating the incompatibility. An around command means replacement, and an argument of the around command indicates the interface information of the replacement object. That is to say, the rule attribute of the description 123B indicates that the set X method of class A is to be replaced with the set Y method of class B.

When the process described with reference to FIG. 4 is executed on the platform source code 120B, the incompatibility interface extracting unit 13 according to the second embodiment generates incompatibility interface information 130B as shown in FIG. 14.

FIG. 14 illustrates an example of the incompatibility interface information 130B according to the second embodiment. The incompatibility interface information 130B shown in FIG. 14 is different from the incompatibility interface information 130A according to the first embodiment in that a correction rule may be included. A correction rule records a value of a correction rule attribute. In the example shown in FIG. 14, a correction rule is recorded for the set X method of class A, based on the platform source code 120B of FIG. 13.

A description is given of the process of the compatibility evaluation apparatus 10 according to the second embodiment. FIG. 15 is a sequence diagram for describing the process of correcting an incompatible part according to the second embodiment. In the process of FIG. 15, it is assumed that the incompatibility interface information 130B has already been generated.

For example, when a user inputs an instruction to specify the SDK application execution code 110 and the incompatibility interface information 130B of the correction target, and to correct the incompatible part, the execution code correction control unit 17 acquires a correction rule from the specified incompatibility interface information 130B (steps S401 and S402). Next, the execution code correction control unit 17 requests the execution code editing unit 18 to execute an around command included in the correction rule (step S403). The execution code editing unit 18 edits the specified SDK application execution code 110 according to the around command (step S404). For example, when the editing is done based on the correction rule of the incompatibility interface information 130B, the part for calling the set X method in class A is changed so as to call the set Y method in class B. As a result, a corrected SDK application execution code 160 is generated.

As described above, according to the second embodiment, the SDK application execution code 110 is automatically edited based on the incompatibility interface information 130 so that the incompatible part is eliminated. Therefore, the user's workload can be significantly reduced. In the second embodiment, a source code of the corresponding SDK application 22 may be used instead of the SDK application execution code 110. In this case, the source code is automatically edited. Thus, the user can compile the edited source code to generate the corrected edited SDK application execution code 160.

Next, a description is given of a third embodiment of the present invention. FIG. 16 illustrates a functional block diagram of the compatibility evaluation apparatus 10 according to the third embodiment of the present invention. In FIG. 16, elements corresponding to those in FIG. 12 are denoted by the same reference numerals and are not further described.

In the third embodiment, an execution code acquiring unit 19 is added. The execution code acquiring unit 19 acquires a patch for eliminating incompatibility. The patch is acquired from a correction program accumulating server 30 that is connected to the compatibility evaluation apparatus 10 via a network. The correction program accumulating server 30 is a computer in which patches for eliminating various incompatibilities are accumulated. In the present embodiment, a patch is a program or a program module (for example, a class file) corresponding to the part to be corrected in the platform execution code 140.

FIG. 17 illustrates an example of a platform source code according to the third embodiment. In FIG. 17, elements corresponding to those in FIG. 13 are denoted by the same reference numerals and are not further described. In a platform source code 120C shown in FIG. 17, the value of the rule attribute in a description 123C "download Patch001.class, around Patch001#setX(Object obj)" is different from that of the second embodiment. That is to say, there are two commands included in the value of the present embodiment. The first command is the download command. The download command indicates to download, from the correction program accumulating server 30, the patch corresponding to the program (Patch001.class) whose identification name (file name) is specified in the argument of the download command. The identification information (for example, an IP address) of the correction program accumulating server 30 may be specified in the argument of the download command. In the present embodiment, it is assumed that the identification information of the correction program accumulating server 30 is pre-recorded in the secondary storage device 102 as a matter of convenience. The second command is the around command. The around command is the same as that described above in the second embodiment. However, in the third embodiment, the method of the replacement object is the set X method of the Patch001 class. The Patch001 class is a method defined in the patch (Patch001.class) that is downloaded according to the download command.

When the process described with reference to FIG. 4 is executed on the platform source code 120C, the incompatibility interface extracting unit 13 according to the third embodiment generates incompatibility interface information 130C as shown in FIG. 18.

FIG. 18 illustrates an example of incompatibility interface information 130C. In the incompatibility interface information 130C shown in FIG. 18, in the correction rule of the set X method of class A, a value of a rule attribute of the description 123C of the incompatibility interface information 130C is recorded.

A description is given of a process performed by the compatibility evaluation apparatus 10 according to the third embodiment. FIG. 19 is a sequence diagram for describing the process of correcting an incompatible part according to the third embodiment. In the process of FIG. 19, it is assumed that the incompatibility interface information 130C has been generated.

Steps S501 and S502 are the same as steps S401 and S402 of FIG. 15, respectively. However, the contents of the acquired correction rule are different. Next, the execution code correction control unit 17 requests the execution code acquiring unit 19 to execute the download command included in the correction rule (step S503). The execution code acquiring unit 19 requests the correction program accumulating server 30 to download the patch (Patch001.class) specified in the argument of the download command (step S504), and acquires the patch (step S505). Next, the execution code acquiring unit 19 applies the acquired patch to the platform execution code 140 (step S506). Specifically, the acquired patch is saved in a predetermined storage area (folder) in the secondary storage device 102. Next, the execution code acquiring unit 19 reports to the execution code correction control unit 17 that the process has ended (step S507).

The subsequent steps S508 and S509 are the same as steps S403 and S404 of FIG. 15, respectively. Thus, the execution code editing unit 18 edits the SDK application execution code 110. However, the edited contents are different from those of the second embodiment. That is to say, in the third embodiment, the part for calling the set X method in class A is changed so as to call the set X method in Patch001, i.e., the method defined in the patch applied to the platform execution code 140.

As described above, according to the third embodiment, a patch can be automatically applied to the SDK platform 23 based on the incompatibility interface information 130. Thus, the user's workload can be significantly reduced. When it is only necessary to apply the patch, there is no need to correct the SDK application execution code 110.

In the above description, the target of compatibility evaluation is a program used in the image forming apparatus 20. However, the program evaluated according to the present embodiment is not limited to that used in the image forming apparatus 20. The present embodiment may be effectively applied to programs used in other electronic devices or general-purpose computers.

The present invention is not limited to the specific embodiments described herein, and variations and modifications may be made without departing from the scope of the present invention.

The present application is based on Japanese Priority Patent Application No. 2009-150817, filed on Jun. 25, 2009, the entire contents of which are hereby incorporated herein by reference.

What is claimed is:

1. A compatibility evaluation apparatus for evaluating compatibility between a platform program and an application program that uses interfaces provided by the platform program, the compatibility evaluation apparatus comprising:
   an application analyzing unit configured to analyze the application program and extract a list of the interfaces used by the application program;
   an incompatibility interface usage determination unit configured to extract, from the list of the interfaces used by the application program, an interface that corresponds to an incompatible interface that does not satisfy a specification, the interface being extracted with the use of a first storage unit storing information indicating a type of incompatibility for each of incompatible interfaces among the interfaces provided by the platform program;
   a compatibility report creating unit configured to generate a compatibility report and record the compatibility report in a second storage unit, the compatibility report including the information indicating the type of incompatibility for each interface that has been extracted by the incompatibility interface usage determination unit, and including instructional information on correcting at least one of the type of incompatibility; and
   an editing unit configured to correct a usage part of the incompatible interface used by the application program based on interface information indicating a correction rule on correcting the at least one of the type of incompatibility and indicating a replacement object, the editing unit further configured to correct the usage part of the incompatible interface by editing code associated with the application program according to the correction rule, wherein
   at least one of the above units is implemented as hardware or as a hardware and software combination.

2. The compatibility evaluation apparatus according to claim 1, further comprising:
   an incompatibility interface extracting unit configured to extract the information indicating the type of incompatibility from a source code of the platform program, and record the extracted information indicating the type of incompatibility in the first storage unit.

3. The compatibility evaluation apparatus according to claim 1, further comprising:
   a combined execution determination unit configured to analyze the platform program and extract, from the list of the interfaces used by the application program, an interface that is not included in the platform program, wherein
   the compatibility report creating unit generates the compatibility report to include information relevant to the interface extracted by the combined execution determination unit, and records the compatibility report, which includes the information relevant to the interface extracted by the combined execution determination unit, in the second storage unit.

4. The compatibility evaluation apparatus according to claim 3, wherein the compatibility report creating unit generates the compatibility report to include the information indicating the type of incompatibility for each interface that has been extracted by the incompatibility interface usage determination unit, the instructional information on correcting the at least one of the type of incompatibility, and the information relevant to the interface extracted by the combined execution determination unit, the information indicating the type of incompatibility, the instructional information, and the information relevant to the interface being different.

5. The compatibility evaluation apparatus according to claim 1, wherein
the first storage unit stores the interface information indicating the correction rule on correcting the at least one of the type of incompatibility and indicating the replacement object for at least one of the incompatible interfaces, the interface information being used as a correction method for eliminating incompatibility.

6. The compatibility evaluation apparatus according to claim 1, further comprising:
a program acquiring unit configured to acquire a program via a network and apply the program to the platform program, wherein
the first storage unit stores an identification name of the program to be acquired for at least one of the incompatible interfaces, the program being used as a correction method for eliminating incompatibility.

7. The compatibility evaluation apparatus according to claim 1, wherein the interfaces include an interface for using a scan function, an interface for using a print function, and an interface for using a copy function.

8. A compatibility evaluation method executed by a computer for evaluating compatibility between a platform program and an application program that uses interfaces provided by the platform program, the compatibility evaluation method comprising:
an application analyzing step of analyzing the application program and extracting a list of the interfaces used by the application program;
an incompatibility interface usage determination step of extracting, from the list of the interfaces used by the application program, an interface that corresponds to an incompatible interface that does not satisfy a specification, the interface being extracted with the use of a first storage unit storing information indicating a type of incompatibility for each of incompatible interfaces among the interfaces provided by the platform program;
a compatibility report creating step of generating a compatibility report and recording the compatibility report in a second storage unit, the compatibility report including the information indicating the type of incompatibility for each interface that has been extracted at the incompatibility interface usage determination step, and including instructional information on correcting at least one of the type of incompatibility; and
an editing step of correcting a usage part of the incompatible interface used by the application program based on interface information indicating a correction rule on correcting the at least one of the type of incompatibility and indicating a replacement object, the editing step includes correcting the usage part of the incompatible interface by editing code associated with the application program according to the correction rule.

9. The compatibility evaluation method according to claim 8, further comprising:
an incompatibility interface extracting step of extracting the information indicating the type of incompatibility from a source code of the platform program, and recording the extracted information indicating the type of incompatibility in the first storage unit.

10. The compatibility evaluation method according to claim 8, further comprising:
a combined execution determination step of analyzing the platform program and extracting, from the list of the interfaces used by the application program, an interface that is not included in the platform program, wherein
the compatibility report creating step includes generating the compatibility report to include information relevant to the interface extracted at the combined execution determination step, and recording the compatibility report, which includes the information relevant to the interface extracted at the combined execution determination step, in the second storage unit.

11. The compatibility evaluation method according to claim 8, further comprising:
a storing step of storing, in the first storage unit, the interface information indicating the correction rule on correcting the at least one of the type of incompatibility and indicating the replacement object for at least one of the incompatible interfaces, the interface information being used as a correction method for eliminating incompatibility.

12. The compatibility evaluation method according to claim 8, further comprising:
a program acquiring step of acquiring a program via a network and applying the program to the platform program, wherein the first storage unit stores an identification name of the program to be acquired for at least one of the incompatible interfaces, the program being used as a correction method for eliminating incompatibility.

13. A non-transitory computer-readable recording medium recording a program that causes a computer to execute a procedure for evaluating compatibility between a platform program and an application program that uses interfaces provided by the platform program, the procedure comprising:
an application analyzing step of analyzing the application program and extracting a list of the interfaces used by the application program;
an incompatibility interface usage determination step of extracting, from the list of the interfaces used by the application program, an interface that corresponds to an incompatible interface that does not satisfy a specification, the interface being extracted with the use of a first storage unit storing information indicating a type of incompatibility for each of incompatible interfaces among the interfaces provided by the platform program;
a compatibility report creating step of generating a compatibility report and recording the compatibility report in a second storage unit, the compatibility report including the information indicating the type of incompatibility for each interface that has been extracted at the incompatibility interface usage determination step, and including instructional information on correcting at least one of the type of incompatibility; and
an editing step of correcting a usage part of the incompatible interface used by the application program based on interface information indicating a correction rule on correcting the at least one of the type of incompatibility and indicating a replacement object, the editing step includes correcting the usage part of the incompatible interface by editing code associated with the application program according to the correction rule.

14. The non-transitory computer-readable recording medium according to claim 13, the procedure further comprising:
an incompatibility interface extracting step of extracting the information indicating the type of incompatibility from a source code of the platform program, and recording the extracted information indicating the type of incompatibility in the first storage unit.

15. The non-transitory computer-readable recording medium according to claim 13, the procedure further comprising:

a combined execution determination step of analyzing the platform program and extracting, from the list of the interfaces used by the application program, an interface that is not included in the platform program, wherein the compatibility report creating step includes generating the compatibility report to include information relevant to the interface extracted at the combined execution determination step, and recording the compatibility report, which includes the information relevant to the interface extracted at the combined execution determination step, in the second storage unit.

16. The non-transitory computer-readable recording medium according to claim 13, the procedure further comprising:

a storing step of storing, in the first storage unit, the interface information indicating the correction rule on correcting the at least one of the type of incompatibility and indicating the replacement object for at least one of the incompatible interfaces, the interface information being used as a correction method for eliminating incompatibility.

17. The non-transitory computer-readable recording medium according to claim 13, the procedure further comprising:

a program acquiring step of acquiring a program via a network and applying the program to the platform program, wherein the first storage unit stores an identification name of the program to be acquired for at least one of the incompatible interfaces, the program being used as a correction method for eliminating incompatibility.

* * * * *